| (12) | United States Patent | (10) Patent No.: | US 8,322,515 B2 |
|---|---|---|---|
| | Rausch et al. | (45) Date of Patent: | Dec. 4, 2012 |

(54) CONVEYOR SYSTEM AND METHOD FOR FEEDING TO A DOWNSTREAM PROCESSING UNIT

(75) Inventors: Karl Rausch, Simmern (DE); Josef Mayer, Wildenwart (DE); Bruno Schmidt, Grosskarolinenfeld (DE)

(73) Assignee: Krones AG, Neutraubling (DE)

( * ) Notice: Subject to any disclaimer, the term of this patent is extended or adjusted under 35 U.S.C. 154(b) by 280 days.

(21) Appl. No.: 12/704,653

(22) Filed: Feb. 12, 2010

(65) Prior Publication Data

US 2010/0200370 A1 Aug. 12, 2010

(30) Foreign Application Priority Data

Feb. 12, 2009 (DE) .................. 10 2009 003 475

(51) Int. Cl.
 *B65G 47/68* (2006.01)
(52) U.S. Cl. ........ 198/445; 198/436; 198/458; 209/559; 209/622
(58) Field of Classification Search .................. 198/436, 198/445, 458; 209/559, 622, 659; 414/799
See application file for complete search history.

(56) References Cited

U.S. PATENT DOCUMENTS

| 3,604,551 | A | * | 9/1971 | Fink ............................... 198/448 |
|---|---|---|---|---|
| 4,054,199 | A | | 10/1977 | Polderman |
| 4,347,937 | A | * | 9/1982 | Reich ............................ 209/622 |
| 4,552,262 | A | * | 11/1985 | Murakami et al. ............ 198/447 |
| 4,860,882 | A | * | 8/1989 | Maeda et al. .................. 198/458 |
| 4,917,230 | A | * | 4/1990 | Barchman ..................... 198/434 |
| 4,932,514 | A | * | 6/1990 | Doppenberg ................. 198/445 |
| 5,456,058 | A | * | 10/1995 | Ziegler ............................. 53/447 |
| 5,769,204 | A | * | 6/1998 | Okada et al. ................... 198/443 |
| 5,868,238 | A | * | 2/1999 | Bonnet ....................... 198/370.1 |
| 6,201,203 | B1 | * | 3/2001 | Tilles ............................ 209/584 |
| 6,206,174 | B1 | * | 3/2001 | Koltz ............................ 198/444 |
| 6,328,151 | B1 | * | 12/2001 | Spangenberg et al. .... 198/347.4 |
| 6,478,138 | B1 | * | 11/2002 | Edwards et al. ......... 198/370.06 |
| 6,513,641 | B1 | * | 2/2003 | Affaticati et al. ............. 198/357 |
| 6,784,391 | B2 | * | 8/2004 | Takizawa ...................... 209/583 |
| 6,923,307 | B2 | * | 8/2005 | Haan et al. ................. 198/347.4 |
| 7,589,294 | B2 | * | 9/2009 | Burns et al. ................... 209/584 |
| 7,863,536 | B2 | * | 1/2011 | Cerutti et al. ................. 209/583 |
| 8,092,140 | B2 | * | 1/2012 | Baker et al. ................... 414/268 |
| 2007/0068854 | A1 | | 3/2007 | Cerutti et al. |

FOREIGN PATENT DOCUMENTS

| DE | 104762 | 3/1974 |
|---|---|---|
| DE | 2541813 C2 | 10/1986 |
| DE | 19514928 A1 | 6/1996 |
| DE | 19530626 A1 | 2/1997 |
| DE | 20120666 U1 | 6/2003 |
| DE | 202006013691 U1 | 12/2007 |
| FR | 2754239 A1 | 4/1998 |
| FR | 2849647 | 1/2003 |
| WO | 03/053826 A1 | 7/2003 |

\* cited by examiner

*Primary Examiner* — Douglas Hess

(74) *Attorney, Agent, or Firm* — Simpson & Simpson, PLLC

(57) ABSTRACT

A conveyor system and a method for feeding articles of at least two different types to a downstream processing unit are disclosed. The conveyor system comprises an infeed unit for the articles, an arrangement zone downstream from the infeed unit, and a lane zone downstream from the arrangement zone. In the lane zone the articles are transported to the downstream processing unit in an ordered state. The infeed unit comprises at least two conveyor belts, to each of which there corresponds a direction of transport for the articles in a section of the arrangement zone, wherein the directions of transport enclose an angle between them.

15 Claims, 7 Drawing Sheets

CONVEYOR SYSTEM AND METHOD FOR FEEDING TO A DOWNSTREAM PROCESSING UNIT

CROSS REFERENCE TO RELATED APPLICATIONS

This patent application claims priority of German Patent Application No. DE 10 200 003 475.7, filed on Feb. 12, 2009, which application is incorporated herein by reference in its entirety.

FIELD OF THE INVENTION

The present invention relates to a conveyor system for feeding articles of at least two different types.

The present invention also relates to a method for feeding articles to a downstream processing unit by a conveyor system. The present invention in particular relates to a method for feeding articles of at least two different types to a downstream processing unit by a conveyor system. The articles are transported to an arrangement zone of the conveyor by an infeed unit of the conveyor system and are subsequently transported onward to a lane zone of the conveyor system. The lane zone feeds the articles to the downstream processing unit in an ordered state.

BACKGROUND OF THE INVENTION

German Patent DE 25 41 813 C2 discloses an apparatus or conveyor for arranging articles of a single type. The articles are fed to an arrangement zone through plural parallel feeding lanes of a single conveyor belt. The articles are transferred from the feeding lanes to parallel apportioning lanes of the same orientation as the feeding lanes. The arrangement zone is located at the end of the apportioning lanes and comprises a lateral guide which redirects the articles into a single discharge lane (discharger) at the end of the final apportioning lane, at an angle to the feeding direction.

German Patent DE 195 30 626 B4 discloses a method and an apparatus for determining the load of a conveyor for articles with an accumulation and/or redirection section. The loading or filling of the conveyor with articles is contactlessly determined by a distance measurement parallel to the plane of conveyance between a reference position upstream from the accumulation section and the rear article or articles of the accumulated article stream. Only articles of a single type are transported to the accumulation and/or redirection section on a single conveyor belt.

German Patent Application DE 195 14 928 A1 discloses a method and an apparatus for feeding a plurality of lanes for articles with an upstream accumulation table. The articles are fed to the accumulation table by a single conveyor belt (infeed) arranged at right angles to the accumulation table. The transfer of articles from the conveyor belt to the lanes is actively controlled in dependence on the load of the accumulation table and/or of the lanes.

SUMMARY OF THE INVENTION

It is an object of the invention to provide a conveyor system for feeding articles to a downstream processing unit, wherein the conveyor system can handle articles of different types simultaneously and within a compact setup.

The above object is achieved by a conveyor system for feeding articles of at least two different types comprising:

- a processing unit arranged downstream to the conveyor system;
- an infeed unit for the articles;
- an arrangement zone downstream from the infeed unit, wherein the infeed unit has at least two conveyor belts, to each of which a direction of transport corresponds in a section of the arrangement zone, wherein the directions of transport enclose an angle between them; and,
- a lane zone with a plurality of lanes downstream from the arrangement zone, wherein the articles within the lane zone are transported to the processing unit in an ordered state.

It is another object of the invention to provide a method for feeding articles to a downstream processing unit by a conveyor system, which handles articles of different types simultaneously and within a compact setup.

The above object is accomplished by a method for feeding articles of at least two different types to a downstream processing unit, wherein the method comprising the following steps:

- feeding the articles to the arrangement zone on at least two conveyor belts, to each of which there corresponds a direction of transport in a section of the arrangement zone, wherein the directions of transport enclose an angle between them;
- apportioning and feeding of the articles on each conveyor belt to the arrangement zone in a controlled manner, wherein at least one element for apportioning and control is provided for each conveyor belt, in order to handle the different articles;
- guiding the articles in a controlled manner in the arrangement zone, wherein the articles are guided in sections defined by guide rails, separated according to the respective conveyor belt; and,
- providing at least one lane of the lane zone for the articles of each different type, respectively.

The conveyor system for feeding articles, for example containers for liquids, to a downstream processing unit comprises an infeed unit for the articles with at least two conveyor belts. A common arrangement zone is provided downstream from the conveyor belts, in which the articles supplied to it by the conveyor belts are arranged. To each conveyor belt there corresponds a direction of transport in at least one section of the arrangement zone, the directions of transport enclosing an angle between them.

The downstream processing unit can be a packer for forming packs from the supplied articles or a palletizer for the articles.

Each conveyor belt can be loaded with articles of a different type, so that with the packer mixed packs of articles of different types, or with the palletizer mixed pallet layers of articles of different types are producible. A single mixed pack thus can comprise articles of different types, for example two bottles of juice, two bottles of lemonade, and a box of chocolates.

The mixed pack, for example, is wrapped with a pre-cut part of film and kept together by it. Likewise, a single pallet layer can comprise articles of different types, for example, bottles of juice, bottles of lemonade, and boxes of chocolates.

In one embodiment three conveyor belts are provided. In further embodiments the angle between two adjacent conveyor belts can be varied, for example, the angle can be 90 degrees. As an alternative, the conveyor belts can be arranged in parallel. In a preferred embodiment, three conveyor belts are provided, which are at right angles to each other, one parallel, the other two at right angles to the lane zone (see FIGS. 1 to 6). Thus a compact setup of the conveyor system and the downstream processing unit is achieved. In a further embodiment three conveyor belts are arranged in parallel (see FIG. 7). Here, also, a compact setup of the conveyor system and the downstream processing unit is achieved. In the conveyor according to the invention the directions of transport at least in a section of the arrangement zone always enclose angles between them, independently of the position of the conveyor belts and the angles enclosed between the conveyor belts.

In a preferred embodiment at least one element for apportioning and control is provided for each conveyor belt, by which the articles are transferred from a respective conveyor belt to the arrangement zone in a controlled and apportioned manner. The elements for apportioning and control may comprise motors and preferably are settable in such a way that only one of the conveyor belts actively supplies articles and the other conveyor belts are deactivated, or in such a way that at least two of the conveyor belts actively supply articles. In the latter case the elements for apportioning and control thus serve to configure the mixed packs or mixed pallets described above. Alternatively or additionally the element for apportioning and control may comprise at least one photoelectric sensor, which determines the width of the article stream in the transfer area from a respective conveyor belt to the arrangement zone. Such a photoelectric sensor also affects the speed of the respective motor of the respective conveyor belt and assures that at any set output rate of the entire system the arrangement zone is supplied with a uniform and almost pressureless stream of articles of the type corresponding to the respective conveyor belt by this conveyor belt.

Downstream from the arrangement zone a lane zone is provided, from which the articles are fed to the downstream processing unit arranged one after the other in lanes.

In order to transfer the articles in an ordered state from the respective conveyor belt to the arrangement zone and within the latter onward to the lane zone in an ordered state, guide rails may be provided in the arrangement zone. For example the guide rails may be displaceable in and/or retractable into the surface of and/or attachable onto the surface of the arrangement zone. In transport the articles are guided within sections of the arrangement zone defined by the guide rails. The guide rails are straight and/or curved, so that they are flush with the conveyor belts and the lane zone.

If in a first case only a single conveyor belt is active, all articles from this conveyor belt are guided within sections of the arrangement zone defined by the guide rails, and distributed between the lanes of the lane zone. Plural or all sections of the arrangement zone thus may be used for all articles of the type corresponding to the single active conveyor belt. Correspondingly, plural or all lanes of the lane zone may be used for all articles of the type corresponding to the single active conveyor belt.

If, on the other hand, in a second case plural conveyor belts are active, articles of different types can be transported, one type of article per conveyor belt. The articles are then guided within the sections defined by the guide rails, separated according to the respective conveyor belt or type of article. Each section of the arrangement zone thus may be assigned to a different type of article. At least one lane of the lane zone is respectively assigned to the articles of each type. From the articles guided in an ordered state one after the other and separated by type in the lanes of the lane zone mixed packs are bound by the packer or mixed pallets are compiled by the palletizer.

In both cases usually the number of sections in the arrangement zone in which the articles are guided is equal to the number of lanes in which the articles are transferred to the downstream processing unit.

BRIEF DESCRIPTION OF THE DRAWINGS

Below embodiments illustrate the invention and its advantages with reference to the figures provided. The size ratios of individual elements in the figures do not always correspond to the real size ratios, as some shapes are shown simplified, and other shapes enlarged with respect to other elements, for better illustration.

DETAILED DESCRIPTION OF THE INVENTION

Figure 1:
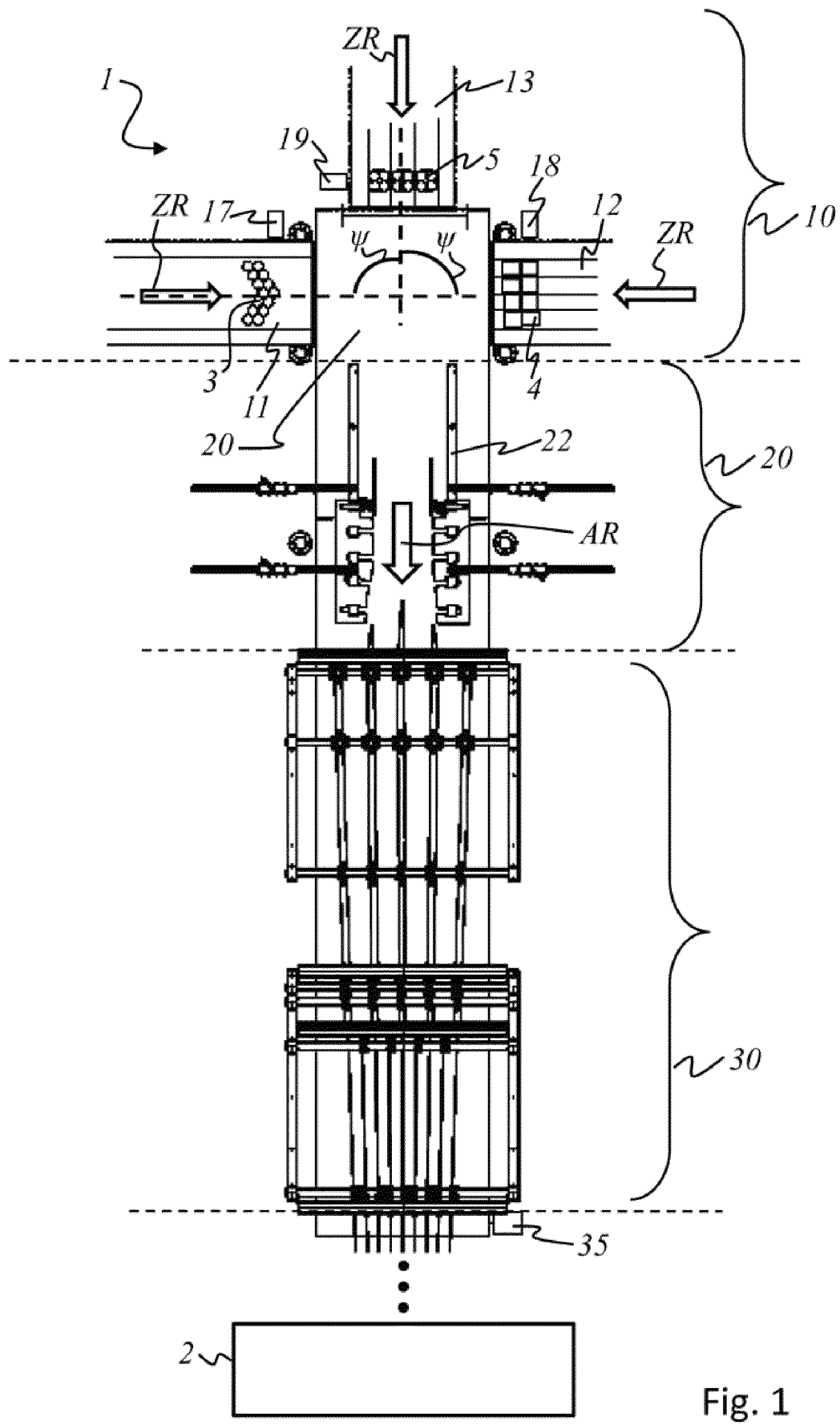
FIG. 1 shows a schematic top view of an embodiment of the conveyor system according to the invention, the conveyor system exhibiting three conveyor belts arranged at right angles to each other.

Identical reference numerals are used for like elements of like function. For the sake of clarity only those reference numerals are shown in the figures which are necessary for the description of the respective figure. The embodiments shown are only examples of how the apparatus according to the invention or the method according to the invention may be implemented; the scope of the invention is not limited to the embodiments shown.

FIG. 1 shows a schematic top view of a preferred embodiment of conveyor system 1 according to the invention. Infeed unit 10 comprises three conveyor belts 11, 12, 13; angle $\psi$ of 90 degrees is enclosed between adjacent conveyor belts. Conveyor system 1 is in a stand-by mode and inactive. Articles 3, 4, 5 are shown at the ends of the respective conveyor belts 11, 12, 13 only for purposes of illustration. If conveyor system 1 is active, articles 3, 4, 5 are carried along a respective infeed direction ZR on respective conveyor belts 11, 12, 13 to arrangement zone 20, and from there along an onward direction AR to lane zone 30. Further guide rails 22 (sectional strips) may be provided on the sides of arrangement zone 20, further guide rails 22 being settable to include an area of a specified width between them.

Conveyor belts 11, 12, 13 usually are configured in dependence on the configuration of articles 3, 4, 5, differently if necessary, as shown here. On first conveyor belt 11, for example, individual containers 3 (articles of a first type) are carried in a stream within a single wide lane, if first conveyor belt 11 is active. Within a plurality of lanes of second conveyor belt 12, for example, molded containers 4 (articles of a second type) are carried, if second conveyor belt 12 is active. Within a plurality of lanes of third conveyor belt 13, for example, multipacks 5 (articles of a third type) are carried, if third conveyor belt 13 is active. It is obvious that the specific types of articles mentioned here and also later in the context of the further figures do not limit the scope of the invention.

The further elements are described in detail in the subsequent figures.

Figure 2:
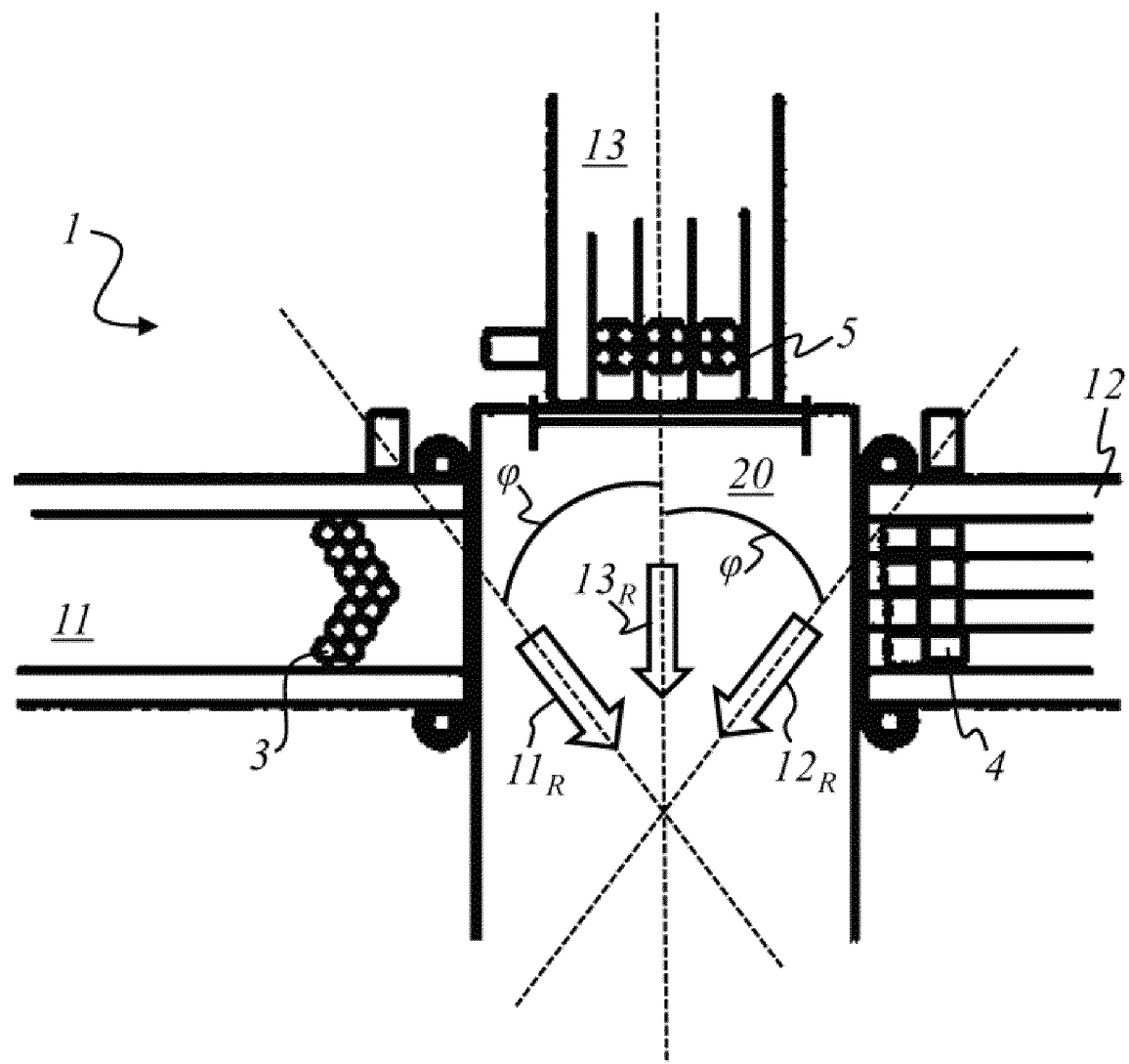
FIG. 2 shows a detail of the conveyor system of FIG. 1, wherein the directions of transport are shown, which in a section of the arrangement zone enclose an angle between them.

FIG. 2 shows a detail of conveyor system 1 of FIG. 1, wherein the directions of transport $11_R$, $12_R$, $13_R$ for articles 3, 4, 5 are shown, which in a section of arrangement zone 20 enclose an angle between them. In this section the directions of transport $11_R$ and $13_R$ enclose angle $\phi$ between them, and transport directions $13_R$ and $12_R$ also enclose angle $\phi$ between them in another section of arrangement zone 20. The two angles $\phi$ may be of equal or different size. In FIGS. 3 to 7 the directions of transport $11_R$, $12_R$, $13_R$ and corresponding angles $\phi$ are only shown in part or not at all, for the sake of clarity. They are, however, always defined, both in an active and an inactive state of conveyor belts 11, 12, 13 and also for any possible arrangement of conveyor belts 11, 12, 13 with respect to each other.

Figure 3:
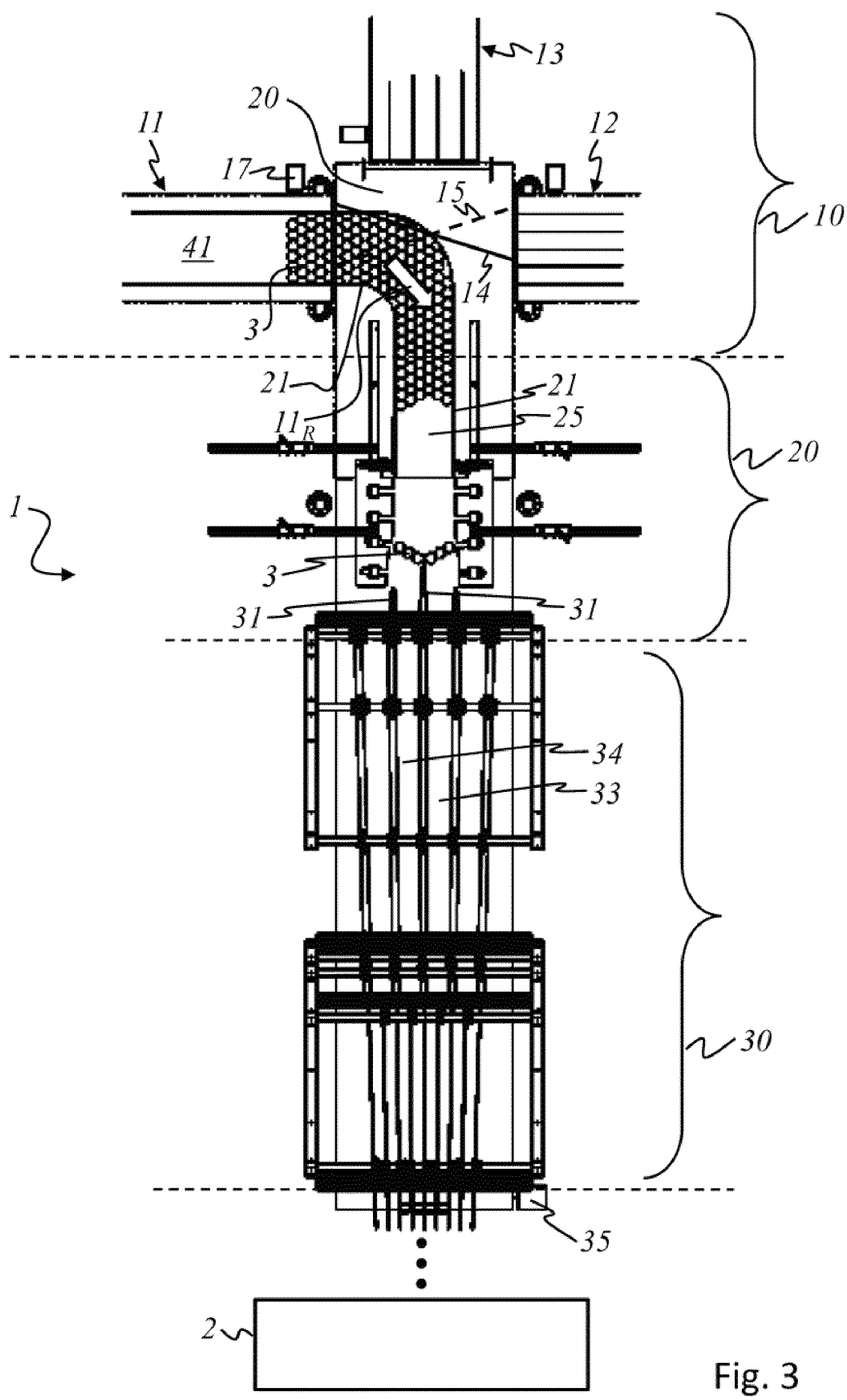
FIG. 3 shows a schematic top view of the conveyor system of FIG. 1, wherein only the first conveyor belt is active, which supplies articles of a first type.

FIG. 3 shows a schematic top view of conveyor system 1 of FIG. 1, wherein only first conveyor belt 11 is active and carries individual containers 3 in a stream within a single wide lane 41 of first conveyor belt 11. Second and third conveyor belts 12, 13 are inactive and do not carry articles 4, 5 of the second or third type, respectively.

Apportioning and control for individual containers 3 on first conveyor belt 11 is possible through first motor 17 and first photoelectric sensor 14. First photoelectric sensor 14 determines the width of the stream of containers in the transfer area from first conveyor belt 11 to arrangement zone 20. First photoelectric sensor 14 affects the speed of first motor 17 and assures that, at any set output rate of the entire system, a uniform and almost pressureless stream of individual containers 3 is supplied to arrangement zone 20 from first conveyor belt 11.

Second photoelectric sensor 15 is provided for inactive second conveyor belt 12 and thus is also inactive or is not evaluated (in FIG. 1 the two photoelectric sensors 14, 15 are not shown for the sake of clarity).

Two curved guide rails 21 are provided in arrangement zone 20, along which individual containers 3 are guided within arrangement zone 20, starting from the end of lane 41 of the single active first conveyor belt 11. In this way individual containers 3 are carried in the stream within first section 25 of arrangement zone 20, first section 25 being defined by the two guide rails 21.

At the end of arrangement zone 20 individual containers 3 are one by one directed into and distributed between two lanes 33 and 34 of lane zone 30 by three lane splitters 31. The further lanes of lane zone 30 are not used for the transport of individual containers 3 in the embodiment according to FIG. 3.

A fourth motor 35 at the end of lane zone 30 controls the velocity at which individual containers 3 in the two lanes 33 and 34 of lane zone 30 are carried to downstream processing unit 2. Downstream processing unit 2 binds supplied individual containers 3 into packs (not shown), if downstream processing unit 2 is a packer, or it palletizes supplied individual containers 3, if the downstream processing unit 2 is a palletizer. A packer and a palletizer are well known in the art.

Figure 4:
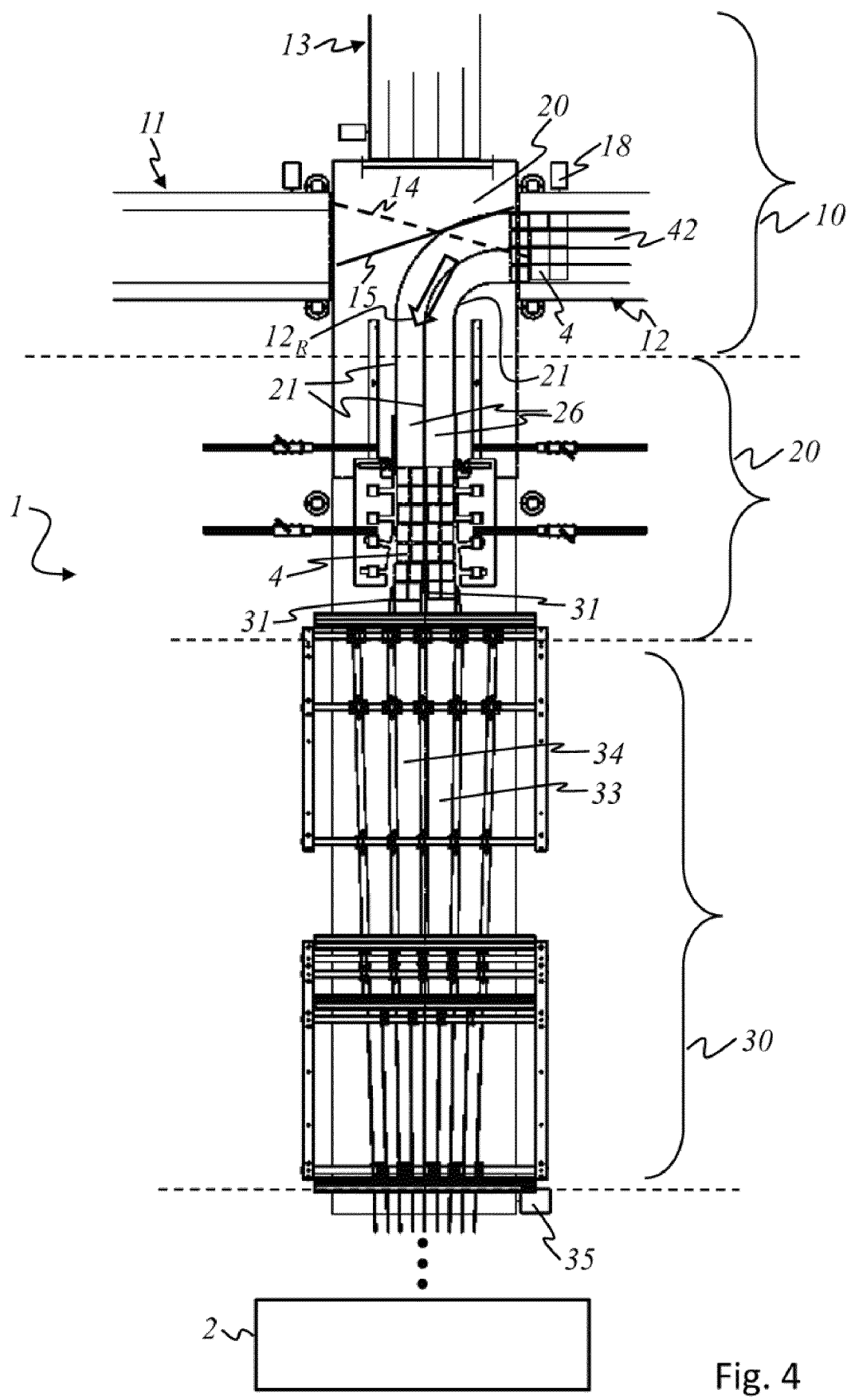
FIG. 4 shows a schematic top view of the conveyor system of FIG. 1, wherein only the second conveyor belt is active, which supplies articles of a second type.

FIG. 4 shows a schematic top view of conveyor system 1 of FIG. 1, wherein only second conveyor belt 12 is active and carries molded containers 4 in four lanes 42 of second conveyor belt 12. First and the third conveyor belt 11, 13 are inactive and do not carry articles 3, 5 of the first and third type.

Apportioning and control for molded containers 4 is accomplished on second conveyor belt 12 through second motor 18 and second photoelectric sensor 15, the roles of which with respect to the transport of molded containers 4 are analogous to the roles of first motor 17 and first photoelectric sensor 14, which have been described in the context of FIG. 3. Correspondingly, molded containers 4 also are supplied to arrangement zone 20 in a controlled and apportioned manner from second conveyor belt 12. As first conveyor belt 11 is inactive, first photoelectric sensor 14 is also inactive or is not evaluated.

Three curved guide rails 21 are provided in arrangement zone 20, along which molded containers 4 are guided from the end of single active second conveyor belt 12 into arrangement zone 20 and from there onward to lane zone 30. Therein molded containers 4 are carried within two second sections 26 defined by the three guide rails 21. Thus always a pair of molded containers 4 from two neighboring lanes 42 of second conveyor belt 12 are directed into section 26 which is adjacent to two respective lanes 42.

At the end of arrangement zone 20 molded containers 4 are one by one directed into and distributed between two lanes 33 and 34 of lane zone 30 by three lane splitters 31. The further lanes of lane zone 30 are not used for the transport of molded containers 4 in the embodiment of FIG. 4, either.

Fourth motor 35 at the end of lane zone 30 controls the velocity at which molded containers 4 are carried to downstream processing unit 2 within two lanes 33 and 34 of lane zone 30. Downstream processing unit 2 binds supplied molded containers 4 into packs (not shown) or palletizes supplied molded containers 4.

Figure 5:
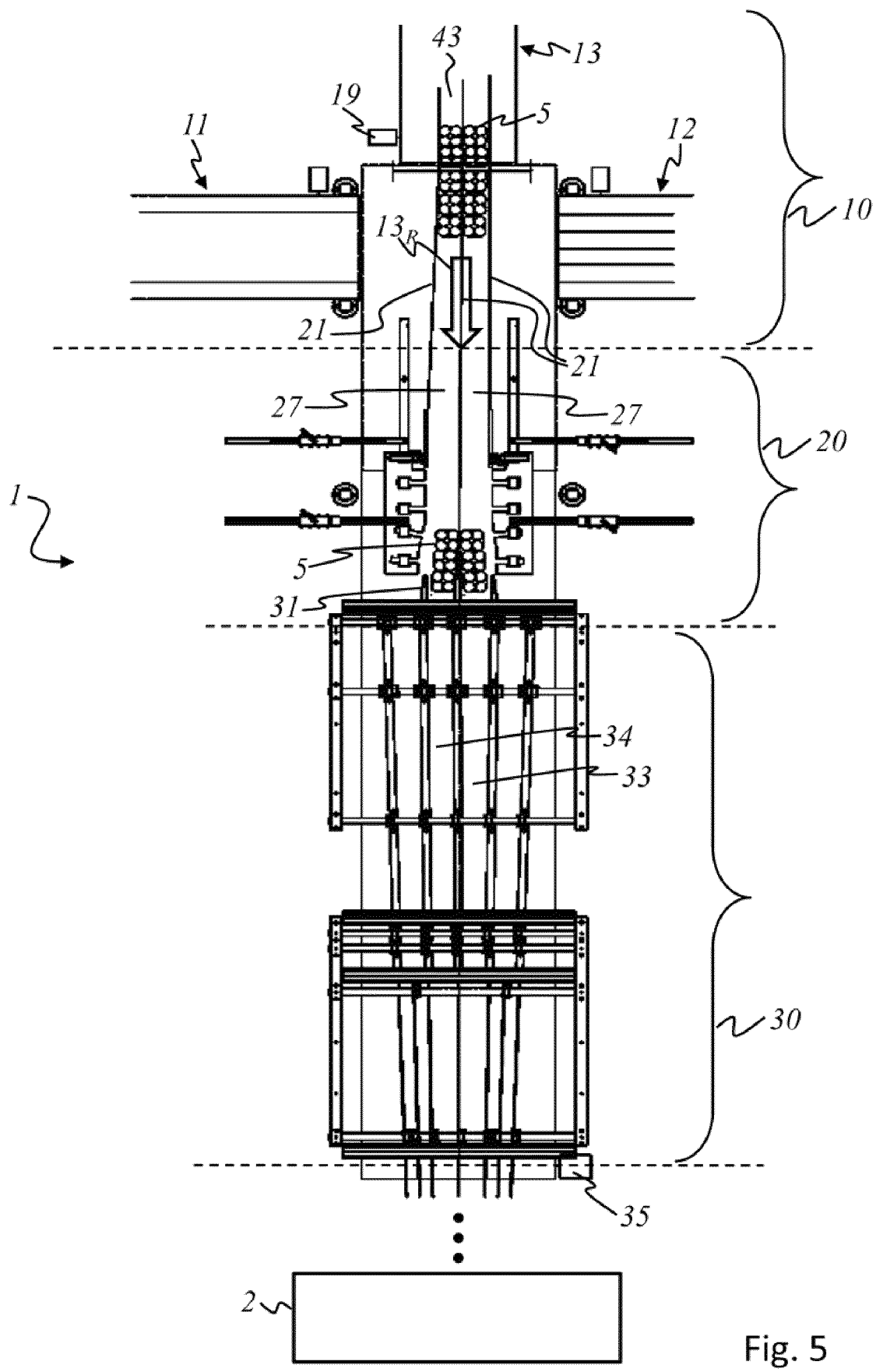
FIG. 5 shows a schematic top view of the conveyor system of FIG. 1, wherein only the third conveyor belt is active, which supplies articles of a third type.

FIG. 5 shows a schematic top view of conveyor system 1 of FIG. 1, wherein only third conveyor belt 13 is active and carries multi-packs 5 within two lanes 43 of third conveyor belt 13. In the embodiment shown single multi-pack 5 is a pack of four containers. First and second conveyor belts 11, 12 are inactive and do not carry articles 3, 4 of the first and second type, respectively.

In the embodiment according to FIG. 5 three essentially linear guide rails 21 are provided in arrangement zone 20, along which multi-packs 5 are guided from the end of two lanes 43 of third conveyor belt 13 through two third sections 27 of arrangement zone 20, third sections 27 being defined by guide rails 21, into the two lanes 33 and 34 of lane zone 30.

Apportioning and control for multi-packs 5 is accomplished for third conveyor belt 13 by third motor 19, which is arranged analogously to first and second motors 17, 18 of FIGS. 3 and 4. For controlling a supply of multi-packs 5 to third sections 27 in a uniform and almost pressure-less stream photoelectric sensors 14, 15 can be used (not shown in FIG. 5 for the sake of clarity). Third sections 27 essentially constitute a linear path for the transport of multi-packs 5.

In summary multi-packs 5 are supplied to arrangement zone 20 from third conveyor belt 13 controlled and apportioned by third motor 19 and guide rails 21, and then are guided onward to lane zone 30 in a controlled and apportioned way.

At the end of arrangement zone 20 multi-packs 5 are one by one directed into and distributed between the two lanes 33, 34 of lane zone 30 by three lane splitters 31. Motor 35 controls the velocity at which multi-packs 5 are carried within lanes 33, 34 of lane zone 30 to downstream processing unit 2, wherein the velocity in lanes 33 and 34 of lane zone 30 is adapted to the velocities on conveyor belt 13 and within arrangement zone 20.

Downstream processing unit 2 binds supplied multi-packs 5 into packs (not shown) or palletizes the supplied multi-packs 5, respectively.

Figure 6:
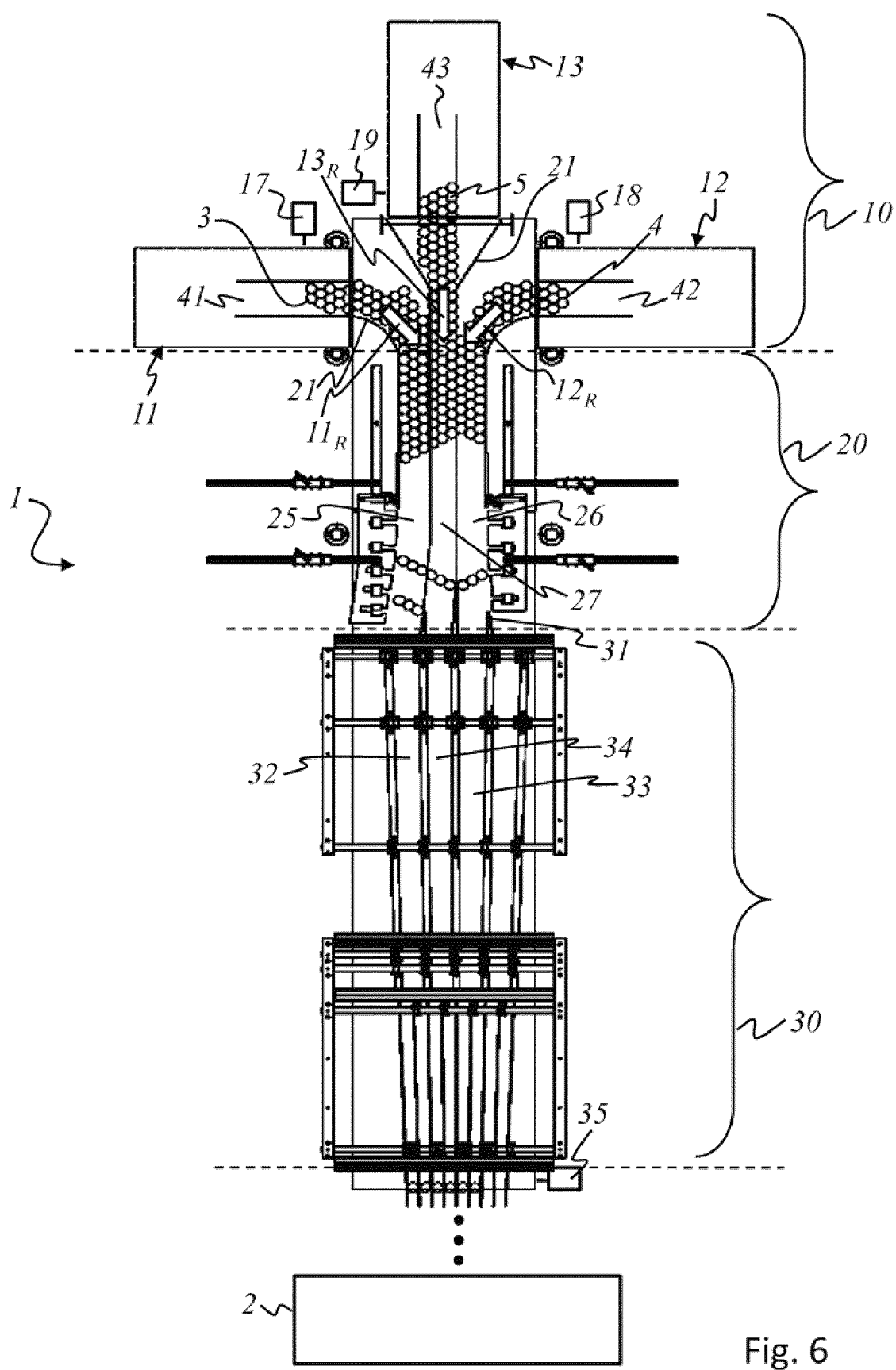
FIG. 6 shows a schematic top view of the conveyor system of FIG. 1, wherein all three conveyor belts are active, so that articles of the first, second, and third kind are supplied; and, FIG. 7 shows a schematic top view of another embodiment of the conveyor system according to the invention, wherein three conveyor belts are arranged in parallel.

FIG. 6 shows a schematic top view of conveyor system 1 of FIG. 1, wherein all three conveyor belts 11, 12, 13 are active. First conveyor belt 11, for example, supplies bottles of orange lemonade 3, second conveyor belt 12, for example, supplies bottles of lemon lemonade 4, and third conveyor belt 13, for example, supplies bottles of coke to arrangement zone 20. Articles 3, 4, 5 of three different types are transported simultaneously within arrangement zone 20, however, separated into three sections 25, 26, 27, which are separated by four guide rails 21. As described above, to each section 25, 26, 27 there corresponds a different type of article or a different conveyor belt 11, 12, 13, respectively: within first section 25 articles 3 of the first type and supplied from first conveyor belt 11 are transported, within second section 26 articles 4 of the second type and supplied from second conveyor belt 12 are transported, and within third section 27 articles 5 of the third type and supplied from third conveyor belt 13 are transported.

Articles 3, 4, 5 are, as has also been described above, transferred from three sections 25, 26, 27 of arrangement zone 20 to lanes 32, 33, 34 of lane zone 30 by three lane splitters 31, separated according to article type or respective conveyor belt 11, 12, 13: articles 3 of the first type are transferred from first section 25 into first lane 32, articles 4 of the second type are transferred from second section 26 into second lane 33, and articles 5 of the third type are transferred from third section 27 into third lane 34. The further lanes of lane zone 30 are not used for the transport of articles 3, 4, 5 in the embodiment according to FIG. 6, either.

Downstream processing unit 2 binds at least one article 3, 4, 5 of each type into a mixed pack (not shown) or compiles articles 3, 4, 5 into pallets of mixed pallet layers (not shown).

FIG. 6 shows that different single bottles are supplied from several conveyor belts 11, 12, 13 simultaneously. It is of course also conceivable to supply multi-packs on one or plural conveyor belts 11, 12, 13 and single articles on different conveyor belts 11, 12, 13, so that eventually a highly variable configuration of packs or pallets or pallet layers, respectively, is possible with the downstream processing machine.

Figure 7:
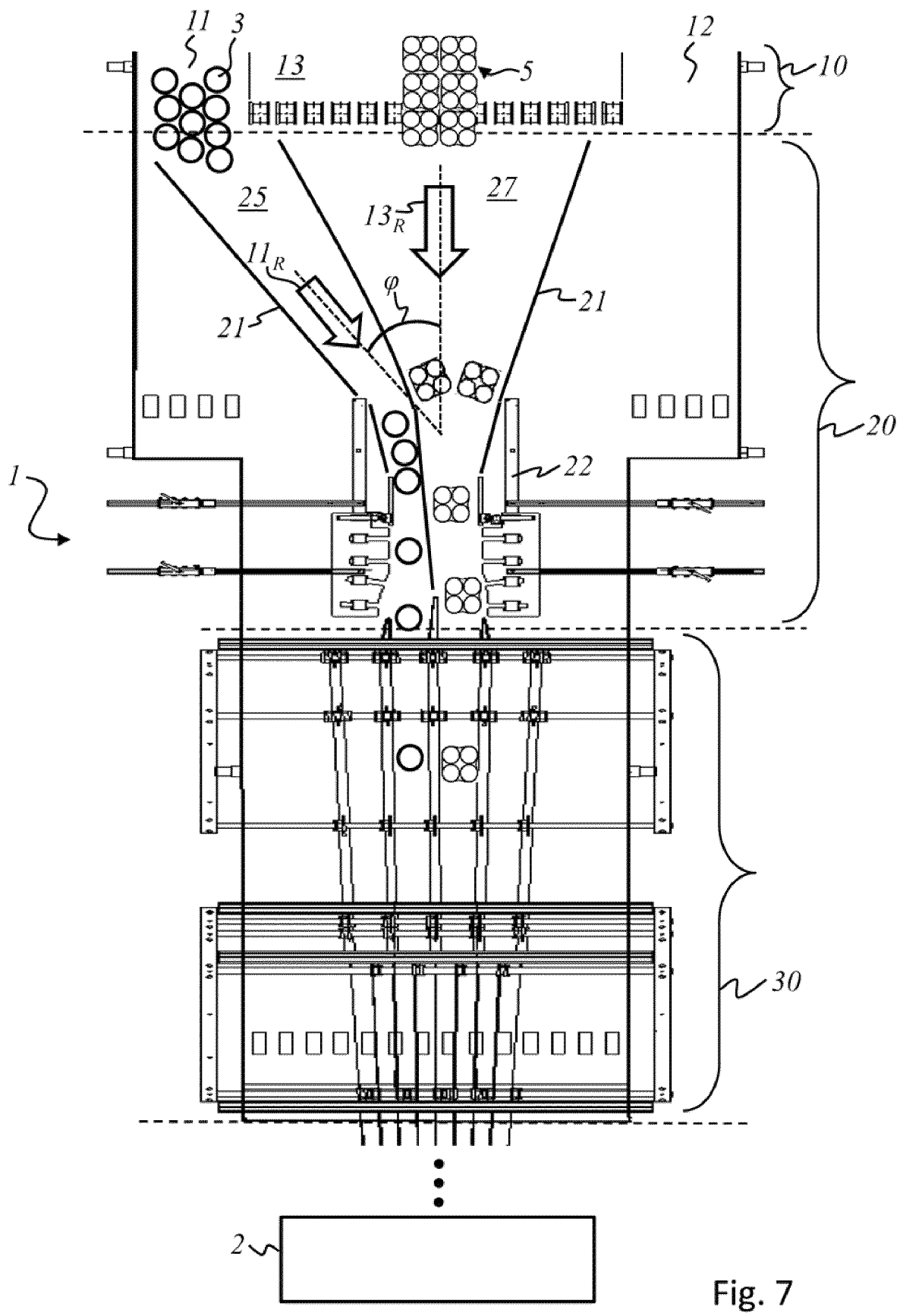

FIG. 7 shows a schematic top view of another embodiment of conveyor system 1 according to the invention with three conveyor belts 11, 12, 13 arranged in parallel. Only first and third conveyor belt 11, 13 are active, second conveyor belt 12 is inactive. The directions of transport $11_R$ and $13_R$ corresponding to the two active conveyor belts 11, 13 enclose angle $\phi$ between them in a section of arrangement zone 20. The further elements in FIG. 7 have already been described in the description of the previous Figures.

The invention has been described with reference to preferred embodiments. It is, however, obvious to a person skilled in the art that alterations and modifications of the invention are possible without leaving the scope of the subsequent claims. In particular two or more than three conveyor belts may be provided, the shapes of the articles may be different for different types of article, for apportioning and control elements different from motors and/or photoelectric sensors may be provided, the guide rails may be arranged differently from what has been shown, a different number and/or configuration of lane splitters may be provided, and the articles of a single type may be distributed to more than one lane of the lane zone, without leaving the scope of the subsequent claims.

What is claimed is:

1. A conveyor system for feeding articles of at least two different types comprising:

a processing unit arranged downstream to the conveyor system;

an infeed unit for the articles;

an arrangement zone downstream from the infeed unit, wherein the infeed unit has at least two conveyor belts, to each of which a direction of transport corresponds in a section of the arrangement zone, wherein the directions of transport enclose an angle between them; and, a lane zone with a plurality of lanes downstream from the arrangement zone, wherein:

the processing unit is configured to bind individual articles into packs or to palletize individual articles; and the articles within the lane zone are transported to the processing unit in an ordered state.

2. The conveyor system of claim 1, wherein three conveyor belts are provided.

3. The conveyor system of claim 2, wherein at least two adjacent conveyor belts are arranged in parallel.

4. The conveyor system of claim 2, wherein each pair of adjacent conveyor belts enclose an angle between them.

5. The conveyor system of claim 4, wherein the angle is 90 degrees.

6. The conveyor system of claim 1, wherein articles of different type, respectively, are transportable by the conveyor belts, such that mixed packs are formable from the articles of different type by the processing unit.

7. The conveyor system of claim 1, wherein elements for apportioning and control are provided for each conveyor belt, by which the articles are transferable from the respective conveyor belt to the arrangement zone apportioned and in a controlled manner.

8. The conveyor system of claim 7, wherein the elements for apportioning and control comprise motors and/or photoelectric sensors.

9. The conveyor system of claim 1, wherein articles of different type, respectively, are transportable by the conveyor belts, such that pallets of mixed pallet layers are producible from the articles of different type by the processing unit.

10. The conveyor system of claim 7, wherein the elements for apportioning and control are settable in such a way that only one of the conveyor belts actively feeds articles and the other conveyor belts are deactivated.

11. The conveyor system of claim 7, wherein the elements for apportioning and control are settable in such a way that at least two of the conveyor belts actively feed articles.

12. The conveyor system of claim 1, wherein guide rails are provided in the arrangement zone, which guide the articles from a single respectively active conveyor belt to the arrangement zone and in the arrangement zone onward to the lane zone, wherein the articles are guided in sections defined by the guide rails.

13. The conveyor system of claim 12, wherein the articles are guided in the sections defined by the guide rails separated according to the respective conveyor belt, and wherein at least one lane of the lane zone is provided for the articles of each of the different types, respectively.

14. A method for feeding articles of at least two different types to a downstream processing unit by a conveyor system, wherein the articles are transported to an arrangement zone of the conveyor system by an infeed unit, and subsequently are transported to a lane zone of the conveyor system, wherein the lane zone feeds the articles to the downstream processing unit in an ordered state, comprising the following steps:

a. feeding the articles to the arrangement zone on at least two conveyor belts, to each of which there corresponds a direction of transport in a section of the arrangement zone, wherein the directions of transport enclose an angle between them;
b. apportioning and feeding of the articles on each conveyor belt to the arrangement zone in a controlled manner, wherein at least one element for apportioning and control is provided for each conveyor belt, in order to handle the different articles;
c. guiding the articles in a controlled manner in the arrangement zone in an onward direction, wherein the articles are guided in sections defined by guide rails aligned in the onward direction, separated according to the respective conveyor belt; and,
d. providing at least one lane of the lane zone for the articles of each different type, respectively.

15. A conveyor system for feeding articles, comprising:
an infeed unit including:
  first and second conveyor belts aligned in first and second directions, respectively, and configured to transport first and second pluralities of articles, respectively; and
an arrangement zone downstream from the infeed unit and configured to:
  receive the first and second pluralities of articles from the infeed unit in a first portion of the arrangement zone;
  transport the first plurality of articles through the first portion in a direction of transport; and,
  transport the first and second pluralities of articles in the second direction through a second portion of the arrangement zone;
a lane zone downstream from the arrangement zone:
  configured to receive the first and second pluralities of articles from the second portion of the arrangement zone;
  including first and second lanes separated by a guide rail aligned in the second direction; and,
  configured to transport the first and second pluralities of articles in the second direction through the first and second lanes, respectively; and,
a processing unit configured to receive the first and second pluralities of articles from the lane zone and configured to bind individual articles into packs or to palletize individual articles, wherein:
  articles in the first plurality of articles are different from articles in the second plurality of articles;
  the first direction is orthogonal to the second direction; and,
  the direction of transport forms an acute angle with the second direction.

* * * * *